US012675352B2

(12) United States Patent
Fisher et al.

(10) Patent No.: US 12,675,352 B2
(45) Date of Patent: Jul. 7, 2026

(54) USE MODEL STATISTICS STORAGE IN A MEMORY SUBSYSTEM

(71) Applicant: Micron Technology, Inc., Boise, ID (US)

(72) Inventors: Ryan G. Fisher, Boise, ID (US); Arvin Daniel Daguro, Boise, ID (US); Christopher Smitchger, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 2 days.

(21) Appl. No.: 18/753,359

(22) Filed: Jun. 25, 2024

(65) Prior Publication Data

US 2025/0130876 A1     Apr. 24, 2025

Related U.S. Application Data

(60) Provisional application No. 63/592,875, filed on Oct. 24, 2023.

(51) Int. Cl.
G06F 11/00 (2006.01)
G06F 11/07 (2006.01)
G06F 11/30 (2006.01)

(52) U.S. Cl.
CPC ........ G06F 11/0727 (2013.01); G06F 11/076 (2013.01); G06F 11/3034 (2013.01)

(58) Field of Classification Search
CPC .................................................... G06F 11/076
See application file for complete search history.

(56) References Cited

U.S. PATENT DOCUMENTS

| | | | | |
|---|---|---|---|---|
| 11,544,183 | B1 * | 1/2023 | Kuzmin | .............. G06F 12/0246 |
| 2023/0222042 | A1 * | 7/2023 | Visconti | .................. G11C 7/04 |
| | | | | 702/147 |

* cited by examiner

*Primary Examiner* — Amine Riad
(74) *Attorney, Agent, or Firm* — NICHOLSON DE VOS WEBSTER & ELLIOTT LLP

(57) ABSTRACT

Methods, systems, and apparatuses include determining, by a memory subsystem, use model statistics for a memory portion of the memory subsystem, where the use model statistics include a count of commands received by the memory subsystem from a host system targeting the memory portion and details about the memory subsystem. It is determined that the memory subsystem is powering down. The use model statistics are stored in a use model statistics storage of the memory subsystem by the memory subsystem in response to determining that the memory subsystem is powering down.

17 Claims, 5 Drawing Sheets

400

DETERMINE USE MODEL STATISTICS
FOR A MEMORY PORTION OF THE
MEMORY SUBSYSTEM
405

DETERMINE THAT THE MEMORY
SUBSYSTEM IS POWERING DOWN
410

STORE THE USE MODEL STATISTICS IN A
USE MODEL STATISTICS STORAGE IN
RESPONSE TO DETERMINING THAT THE
MEMORY SUBSYSTEM IS POWERING
DOWN
415

500

USE MODEL STATISTICS STORAGE IN A MEMORY SUBSYSTEM

CROSS-REFERENCE TO RELATED APPLICATION

The present application claims the benefit of U.S. Provisional Patent Application No. 63/592,875 filed on Oct. 24, 2023, which is incorporated by reference herein in its entirety.

TECHNICAL FIELD

The present disclosure generally relates to use model statistics storage, and more specifically, relates to use model statistics storage in a memory subsystem.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
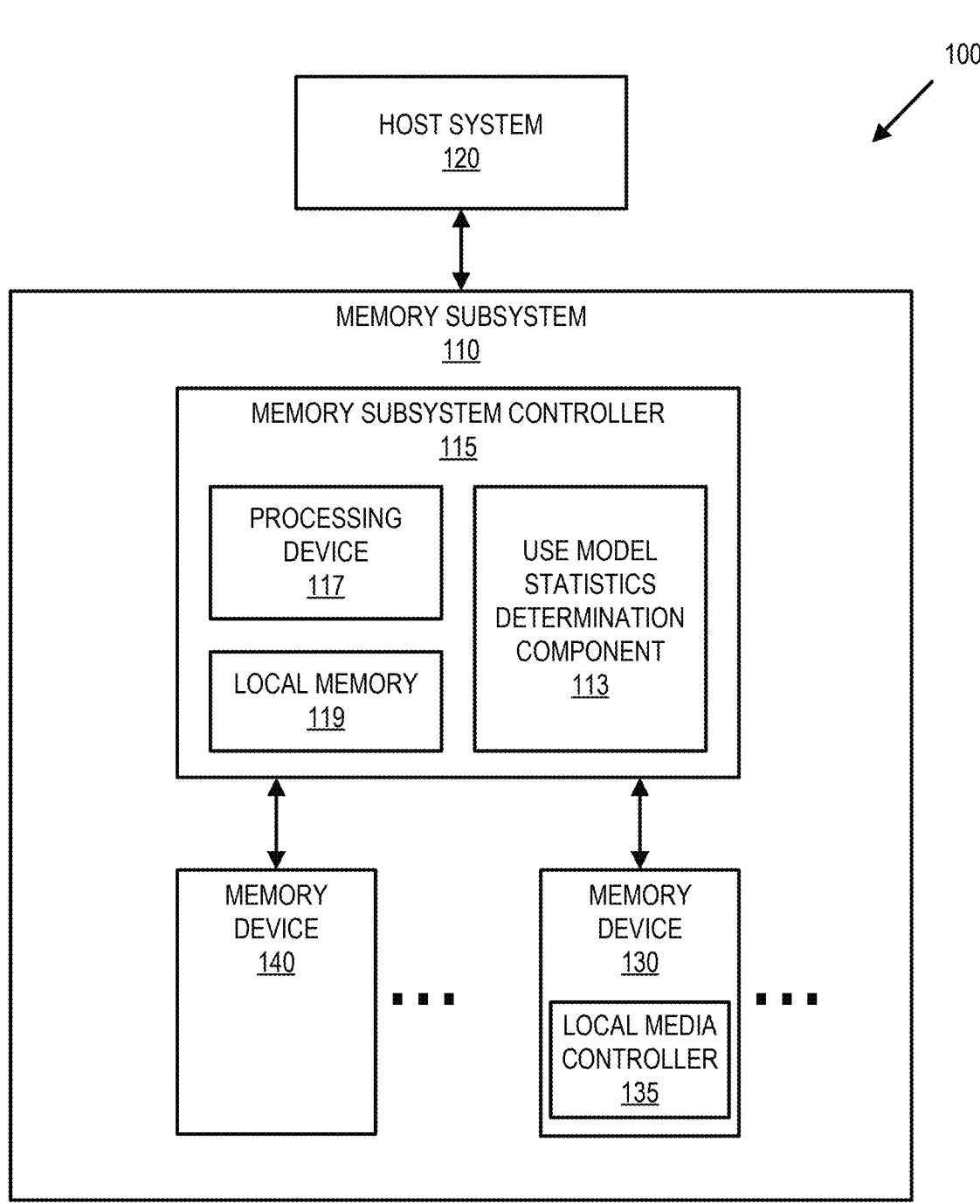
FIG. 1 illustrates an example computing system that includes a memory subsystem in accordance with some embodiments of the present disclosure.

Aspects of the present disclosure are directed to use model statistics storage in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die consists of one or more planes. Planes can be grouped into logic units identified by a logical unit numbers (LUNs). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), quad-level cells (QLCs), and penta-level cells (PLCs). For example, an SLC can store one bit of information and has two logic states while a QLC can store four bits of information and has sixteen logic states.

In conventional memory systems, host systems can track the number and type of commands sent to memory subsystems. This tracking, however, takes significant resources from the host systems. As a result, memory systems typically do not track commands or only track commands very minimally. Additionally, conventional systems do not track these commands over the lifetime of the memory subsystem. Although it is very advantageous to be aware of these use models, most customers are not aware of their specific use models since they do not have sufficient data.

Aspects of the present disclosure address the above and other deficiencies by storing use model statistics by a memory subsystem. Use models describe how a specific memory subsystem functions within the environment of its host system and can include details about commands received from host systems as well as details about the memory subsystem. For example, a use model could indicate that a memory subsystem does not use suspend operations, runs at a certain temperature, has a history of multiple recovery operations, etc. Host system interactions with memory subsystems are becoming increasingly complex and have varying use models, making it even more difficult for a host system to efficiently track. The memory subsystem stores the use model statistics independently of the host system allowing the host system to save resources that would have been used storing the use model statistics (e.g., commands sent to memory subsystem and/or details about the memory subsystem such as register status and temperature). Furthermore, the memory subsystem can track metrics that would be difficult or inaccessible to the host system such as temperature of the memory subsystem. Additionally, since this implementation does not rely on the host system, it can store and use model statistics for the interactions of multiple host systems with the memory subsystem. Furthermore, the use model statistics can be tracked at varying levels of granularity. For example, each die in the memory subsystem can track its own information independently, allowing the memory subsystem to determine inconsistencies in use patterns among multiple dice.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems including memory subsystem 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processing device such as a processor chipset and a software stack executed by the processor chipset. The processor chipset can include one or more cores, one or more caches, a memory controller (e.g., NVDIMM controller), and/or a storage protocol controller (e.g., a peripheral component interconnect express (PCIe) controller, a serial advanced technology attachment (SATA) controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a SATA interface, including a mini-SATA (mSATA) interface, a PCIe interface, including a mini PCIe (mPCIE) interface, a Non-Volatile Memory Express (NVMe) interface, a universal serial bus (USB) interface, an a Fibre Channel, Serial Attached SCSI (SAS), a Small Computer System Interface (SCSI), a double data rate (DDR) memory bus, a dual in-line memory module (DIMM) interface (e.g., DIMM socket interface that supports Double Data Rate (DDR)), an Advanced Host Controller (AHCI) interface, an Open NAND Flash Interface (ONFI) interface, a Double Data Rate (DDR) interface, a Low Power Double Data Rate (LPDDR) interface, any other interface, and/or combinations of these interfaces. The physical host interface can be used to transmit data between the host system 120 and the memory subsystem 110. The host system 120 can further utilize an NVMe interface to access components (e.g., memory devices 130 and 140) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130 and 140 can include any combination of the different types of non-volatile memory devices and/or volatile memory devices. The volatile memory devices (e.g., memory device 140) can be, but are not limited to, random-access memory (RAM), such as dynamic random-access memory (DRAM), synchronous dynamic random-access memory (SDRAM), video random-access memory (VRAM), and cache memory.

Some examples of non-volatile memory devices (e.g., memory device 130) include negative-and (NAND) type flash memory devices and write-in-place type memory devices, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), Spin Transfer Torque (STT)-MRAM, nano-RAM (NRAM), silicon-oxide-nitride-oxide-silicon (SONOS) memory, conductive bridging RAM (CBRAM), resistive random-access memory (RRAM), oxide based RRAM (OxRAM), negative-or (NOR) flash memory, and erasable programmable read-only memory (EPROM), including electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The buffer memory of subsystem controller 115 can include any of the volatile or non-volatile memory types mentioned above including combinations thereof. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in memory subsystem 110 (e.g., stored in a local memory 119). In some examples, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processing device or controller separate from the memory subsystem 110).

In general, the memory subsystem controller 115 can receive commands or operations from the host system 120 and can convert the commands or operations into instructions or appropriate commands to achieve the desired access to the memory devices (e.g., memory devices 130 and/or 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA) and/or namespace) and a physical address (e.g., physical block address) that are associated with the memory devices (e.g., memory devices 130 and/or 140). The memory subsystem controller 115 can further include host interface circuitry to communicate with the host system 120 via the physical host interface. The host interface circuitry can convert the commands received from the host system into command instructions to access the memory devices (e.g., memory devices 130 and/or 140) as well as convert responses associated with the memory devices into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices (e.g., memory devices 130 and/or 140).

In some embodiments, the memory devices (e.g., memory devices 130 and/or 140) include local media controllers 135 that operate in conjunction with memory subsystem controller 115 to execute operations on one or more memory cells of the memory devices (e.g., memory devices 130 and/or 140). An external controller (e.g., memory subsystem controller 115) can externally manage the memory devices (e.g., perform media management operations on the memory devices 130 and/or 140). In some embodiments, a memory device (e.g., memory device 130) is a managed memory device, which is a raw memory device combined with a local controller (e.g., local controller 135) for media management within the same memory device package. An example of a managed memory device is a managed NAND (MNAND) device.

The memory subsystem 110 includes a use model statistics determination component 113 that can determine and store use model statistics. In some embodiments, the controller 115 includes at least a portion of the use model statistics determination component 113. For example, the controller 115 can include a processing device A17 configured to execute instructions stored in local memory 119 for performing the operations described herein. In some embodiments, a use model statistics determination component 113 is part of the host system 120, an application, or an operating system.

The use model statistics determination component 113 can determine use model statistics based on operations received from host system 120 as well as device details of the memory subsystem such as temperature, program erase (PE) cycles, and register data. Further details with regards to the operations of the use model statistics determination component 113 are described below.

Figure 2:
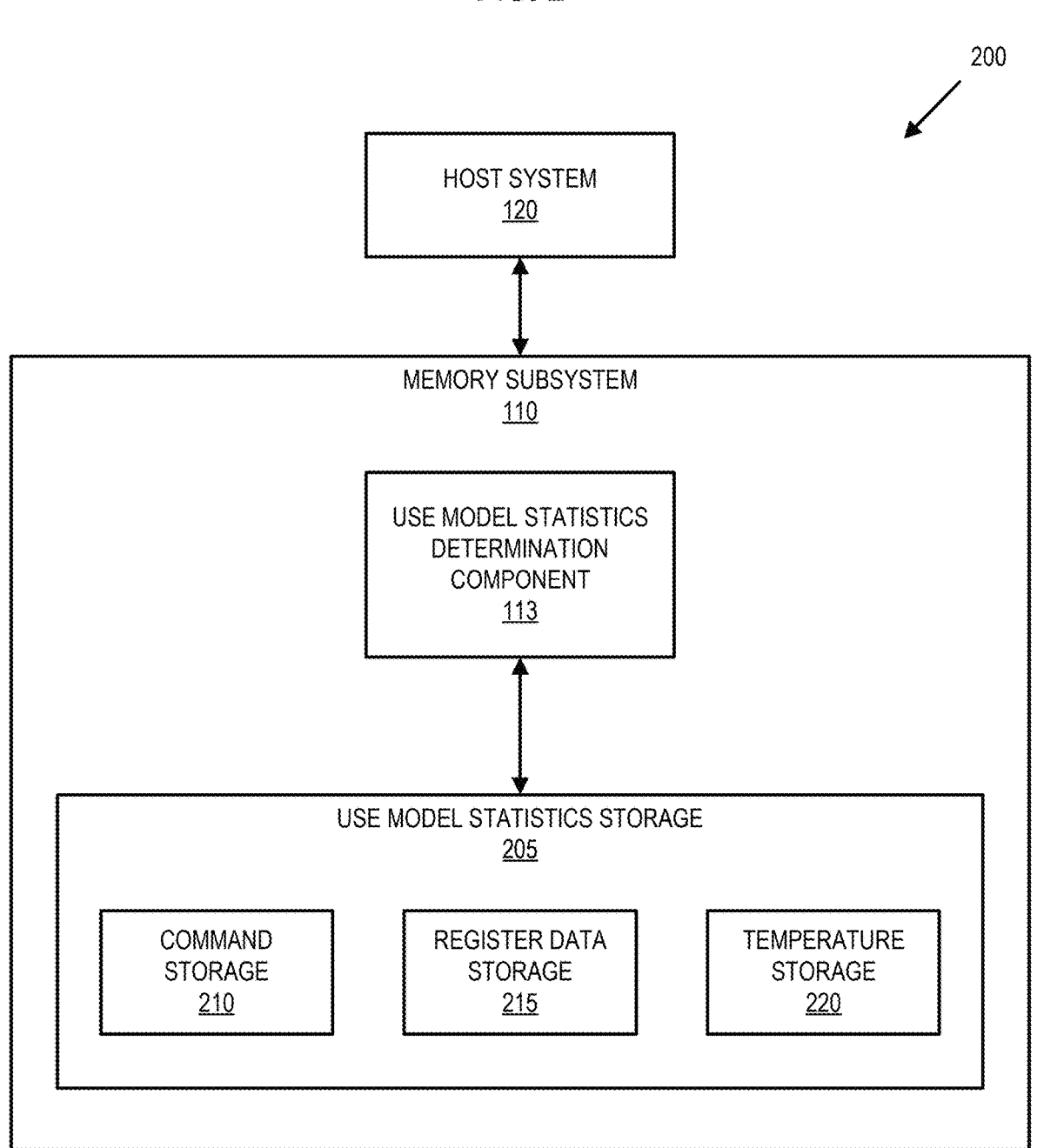
FIG. 2 illustrates another example computing system that includes a memory subsystem in accordance with some embodiments of the present disclosure.

FIG. 2 illustrates another example computing system 200 that includes a memory subsystem in accordance with some embodiments of the present disclosure. As shown in FIG. 2, example computing system 200 can include a host system 120 and a memory subsystem 110. Although only one host system (e.g., host system 120) is illustrated, computing system 200 can operate with multiple host systems coupled to memory subsystem 110. Memory subsystem 110 includes use model statistics determination component 113 and use model statistics storage 205. Use model statistics determination component 113 is coupled to use model statistics storage 205 and configured to store use model statistics in use model statistics storage 205. In some embodiments, use model statistics storage 205 includes command storage 210, register data storage 215, and temperature storage 220.

In some embodiments, use model statistics storage 205 is part of a local memory (e.g., local memory 119 of FIG. 1). In some embodiments, use model statistics storage 205 is part of a memory device (e.g., memory device 140 of FIG. 1). In some embodiments, use model statistics storage 205 is stored in memory includes SLCs. For example, use model statistics storage 205 comprises an SLC block in memory subsystem 110. In some embodiments, use model statistics storage 205 comprises a one-time programmable (OTP) memory storage. For example, use model statistics storage 205 includes an OTP EPROM for storing the use model statistics. In some embodiments, use model statistics storage 205 is accessible to host system 120. For example, host system 120 can send a command with a use model statistics prefix (or other indicator) to memory subsystem 110 allowing host system 120 to read use model statistics storage 205. The use model statistics prefix may be a unique prefix allowing host system 120 to read the dedicated portion of memory for use model statistics storage 205.

Use model statistics determination component 113 can track and record the count of certain commands received from host system 120. For example, use model statistics determination component 113 may track the count of any combination of the following: program commands, erase commands, page read commands, single bit soft bit read operations issued, how often soft data is needed by the host system, intermediate wordline (IWL) read operations issued, program suspend operations, erase suspend operations, set feature commands, auto read calibration operations, and corrective read operations. In some embodiments, use model statistics determination component 113 tracks the count of commands received from host system 120 targeting each respective die in memory subsystem 110. For example, memory subsystem 110 includes a memory device (e.g., memory device 130 of FIG. 1) that includes multiple dice and use model statistics determination component 113 separately tracks the count of commands received from host system 120 for each command type targeting each die in the memory device.

In some embodiments, model statistics determination component 113 is implemented, at least in part, in memory device 130. For example, model statistics determination component 113 tracks and records the count of commands (as well as the other use model statistics) via the NAND dice of memory device 130 and stores the use model statistics in response to determining that the memory subsystem is powering down.

In some embodiments, use model statistics determination component 113 estimates a PE cycle count using the occurrence rate of commands received from host system 120. For example, use model statistics determination component 113 estimates a PE cycle count based on the occurrence rate of program and erase commands received from host system 120. In some embodiments, use model statistics determination component 113 estimates the PE cycle count for each die in memory subsystem 110 based on the occurrence rates of commands received from host system 120 targeting each respective die in memory subsystem 110.

In some embodiments, use model statistics determination component 113 may be configured to track details about memory subsystem 110 such as certain status register events for memory subsystem 110. For example, use model statistics determination component 113 tracks program status fails and erase status fails. In some embodiments, the status register events are stored in a status register of memory subsystem 110. For example, the status register events are register bits stored in a local memory of a memory subsystem controller (such as local memory 119 of memory subsystem controller 115 of FIG. 1). Use model statistics determination component 113 may also be configured to record the temperature for memory subsystem 110. For example, use model statistics determination component 113 records the temperature of a NAND device (e.g., memory device 140 of FIG. 1) in memory subsystem 110 from the last array operation.

In some embodiments, use model statistics determination component 113 tracks and records use model statistics in response to an internal trigger. For example, the internal trigger is a failure status for memory subsystem 110. In response to determining that a failure status bit for memory subsystem 110 is set, use model statistics determination component 113 estimates the PE cycle count as described above and records the estimate PE cycle count and the temperature of a NAND device (e.g., memory device 140 of FIG. 1). In some embodiments, the internal trigger includes the status register events of memory subsystem 110.

In some embodiments, use model statistics determination component 113 stores the tracked use model statistics in use model statistics storage 205 in response to determining that the memory subsystem is powering down. For example, use model statistics determination component 113 determines that memory subsystem 110 is powering down and stores the use model statistics in use model statistics storage 205. In some embodiments, use model statistics determination component 113 stores the tracked count and type of commands in command storage 210, the status register event counts in register data storage 215, and the tracked temperatures in temperature storage 220. In some embodiments, use model statistics determination component 113 receives a temperature reading in response to determining that the memory subsystem is powering down. For example, use model statistics determination component 113 reads the temperature for a memory device stored for the last read array program operation of the memory device and stores the temperature in use model statistics storage 205.

In some embodiments, use model statistics determination component 113 monitors the voltage supply from host system 120 and determines that memory subsystem 110 is powering down in response to determining that the voltage supply satisfies a threshold value. In some embodiments, use model statistics determination component 113 determines that a specific memory device is powering down. For example, use model statistics determination component 113 determines that memory device 140 is powering down by monitoring the voltage supply to memory device 140.

In some embodiments, use model statistics determination component 113 stores the tracked use model statistics in use model statistics storage 205 in response to receiving a command to store the tracked use model statistics. For example, use model statistics determination component 113 receives a command from host system 120 to store the tracked use model statistics and use model statistics determination component 113 stores the tracked use model statistics in use model statistics storage 205 in response to receiving the command from host system 120.

In some embodiments, use model statistics determination component 113 can enable and disable tracking of use model statistics. For example, memory subsystem 110 includes a programmable trim or feature address bit that allows memory subsystem 110 and/or host system 120 to enable and disable the tracking of use model statistics by use model statistics determination component 113.

In some embodiments, use model statistics determination component 113 determines a next free memory subportion to store the use model statistics upon determining that the memory subsystem is powering up. For example, upon determining that memory subsystem 110 is powering up, use model statistics determination component 113 determines a next free page of use model statistics storage 205 to store the use model statistics for the current power cycle. In some embodiments, use model statistics determination component 113 determines the next free memory subportion by determining the next free memory portion in use model statistics storage 205. In some embodiments, use model statistics storage 205 is a block (such as an SLC block) of memory subsystem 110 and the next free subportion is the next free page of the block.

In some embodiments, use model statistics determination component 113 erases use model statistics storage 205 in response to determining that use model statistics storage 205 is full. For example, use model statistics determination component 113 determines that memory subsystem 110 is powering up and that there are no more available memory portions in use model statistics storage 205. Use model statistics determination component 113 erases at least a portion of use model statistics storage 205 and determines a next memory portion of use model statistics storage 205 as an erased portion of use model statistics storage 205.

In some embodiments, use model statistics determination component 113 determines that the memory subsystem 110 is powering up in response to memory subsystem 110 receiving a reset command for a specific NAND target (e.g., memory device 140) from host system 120. In such embodiments, memory subsystem 110 sends power up notification to a memory device in response to receiving a reset command from host system 120 for that memory device. For example, memory subsystem 110 receives a reset command from host system 120 targeting memory device 140. In response to receiving the reset command for memory device 140, use model statistics determination component 113 determines that memory device 140 is powering up.

In some embodiments, use model statistics determination component 113 sets a flag in response to a statistic in the tracked use model statistics reaching a threshold. For example, in response to a temperature reading for a memory device (e.g., memory device 130 of FIG. 1) reaching a threshold temperature, use model statistics determination component 113 sets a flag in a register to notify host system 120 that the threshold temperature has been reached.

Figure 3:
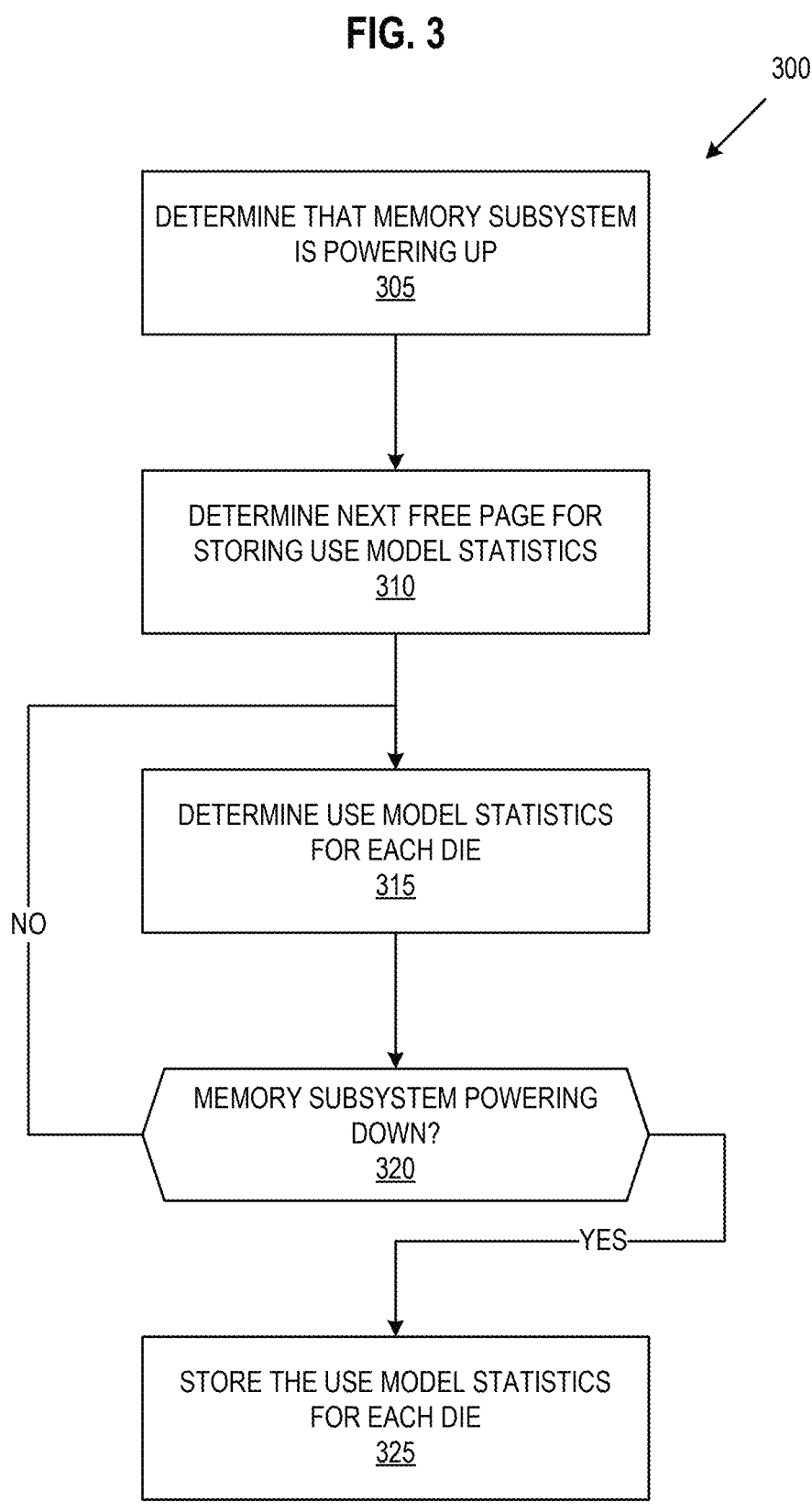
FIG. 3 is a flow diagram of an example method to store use model statistics in accordance with some embodiments of the present disclosure.

FIG. 3 is a flow diagram of an example method 300 to store use model statistics, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by use model statistics determination component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device determines that the memory subsystem is powering up. For example, use model statistics determination component 113 detects a power cycle for the memory subsystem 110, e.g., in response to receiving a power up notification from memory subsystem 110. In some embodiments, memory subsystem 110 receives a reset command for a specific NAND target (e.g., memory device 140) from host system 120. In such embodiments, memory subsystem 110 sends power up notification to a memory device in response to receiving a reset command from host system 120 for that memory device. For example, memory subsystem 110 receives a reset command from host system 120 targeting memory device 140. In response to receiving the reset command for memory device 140, use model statistics determination component 113 determines that memory device 140 is powering up.

At operation 310, the processing device determines the next free page for storing use model statistics. For example, use model statistics determination component 113 determines the next free page in use model statistics storage 205 to store the use model statistics for the current power cycle. In some embodiments, use model statistics determination component 113 erases use model statistics storage 205 in response to determining that use model statistics storage 205 is full. For example, use model statistics determination component 113 determines that there are no more available pages in use model statistics storage 205 and erases a portion of use model statistics storage 205. In such embodiments, use model statistics determination component 113 determines a next free page of use model statistics storage 205 as an erased portion of use model statistics storage 205.

At operation 315, the processing device determines use model statistics for each die. For example, use model statistics determination component 113 tracks and records the count and type of certain commands received from host system 120 targeting each die in memory subsystem 110. For example, use model statistics determination component 113 may track and record any combination of the count of the following: program commands, erase commands, page read commands, single bit soft bit read operations issued, how often soft data is needed by the host system, intermediate wordline (IWL) read operations issued, program suspend operations, erase suspend operations, set feature commands, auto read calibration operations, and corrective read operations. In some embodiments, memory subsystem 110 includes multiple dice and use model statistics determination component 113 tracks and records the count of certain commands received from host system 120 targeting each die.

In some embodiments, the processing device estimates a PE cycle count using the occurrence rate of commands received from a host system. For example, use model statistics determination component 113 estimates a PE cycle count based on the occurrence rate of program and erase commands received from host system 120 targeting each die.

In some embodiments, the processing device tracks certain status register events for each die. For example, use model statistics determination component 113 tracks program status fails and erase status fails for each die in memory subsystem 110. In some embodiments, the status register events are stored in a status register of memory subsystem 110. For example, the status register events are register bits stored in a local memory of a memory subsystem controller (such as local memory 119 of memory subsystem controller 115 of FIG. 1). In some embodiments, the processing device records the temperature for each die. For example, use model statistics determination component 113 records the temperature for each die of a NAND device (e.g., memory device 140 of FIG. 1) in memory subsystem 110 based on the recorded temperature of the last array operation.

At operation 320, the processing device determines whether the memory subsystem is powering down. For example, use model statistics determination component 113 monitors the voltage supply from host system 120 and determines that memory subsystem 110 is powering down in response to determining that the voltage supply satisfies a threshold value. In some embodiments, use model statistics determination component 113 determines that a specific memory device is powering down. For example, use model statistics determination component 113 determines that memory device 140 is powering down by monitoring the voltage supply to memory device 140. If the processing device determines that the memory subsystem is powering down, the method 300 proceeds to operation 325. If the processing device determines that the memory subsystem is not powering down, the method 300 proceeds back to operation 315.

At operation 325, the processing device stores the use model statistics for each die. For example, use model statistics determination component 113 stores the tracked use model statistics in the determined next free page of use model statistics storage 205 in response to determining that the memory subsystem is powering down. In some embodiments, the processing device stores the use model statistics for each die in response to receiving a command to store the use model statistics. For example, use model statistics determination component 113 receives a command from host system 120 to store the tracked use model statistics and use model statistics determination component 113 stores the tracked use model statistics in the next free page of use model statistics storage 205 in response to receiving the command from host system 120.

Figure 4:
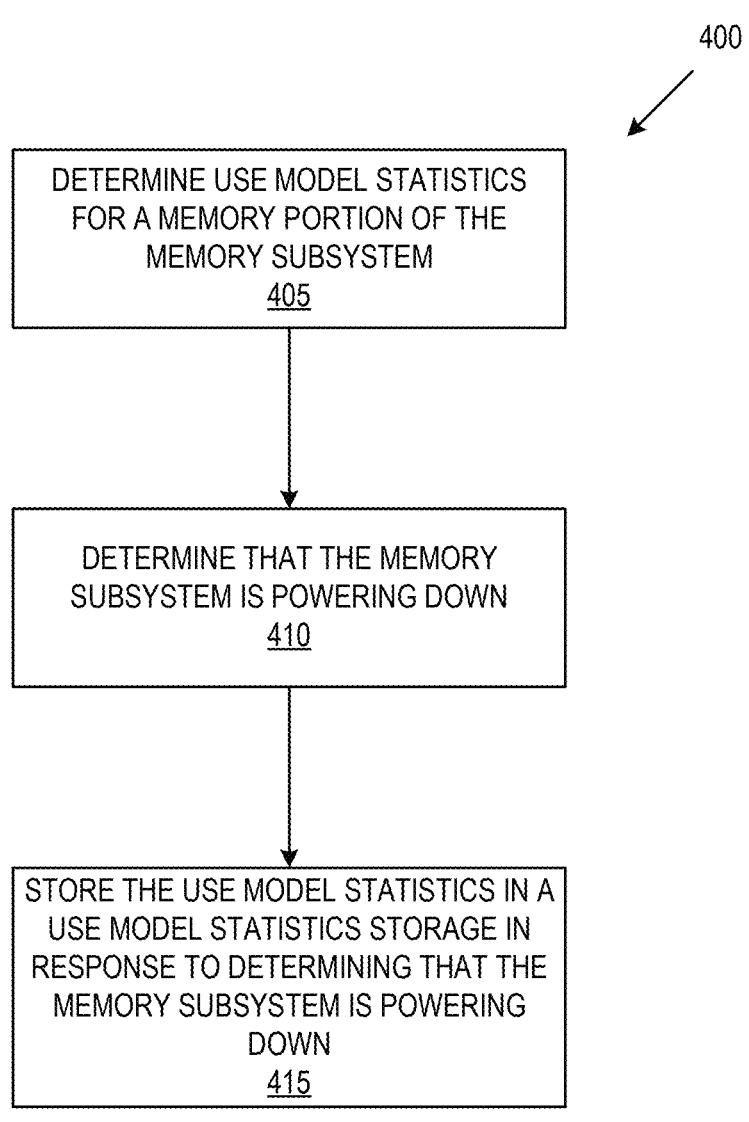
FIG. 4 is another flow diagram of an example method to store use model statistics in accordance with some embodiments of the present disclosure.

FIG. 4 is a flow diagram of an example method 400 to store use model statistics, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the use model statistics determination component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device determines use model statistics for a memory portion of a memory subsystem. For example, use model statistics determination component 113 determines use model statistics for a die of a memory device (e.g., memory device 140 of FIG. 1). Use model statistics can include counts of commands received from a host device, status register bits for a memory device, and temperature readings for a memory device. Further details with regard to determining use model statistics are described with reference to FIGS. 2 and 3.

At operation 410, the processing device detects a power cycle for the memory subsystem. For example, use model statistics determination component 113 determines that memory subsystem 110 is powering down in response to receiving a power down notification from memory subsystem 110.

At operation 415, the processing device stores the use model statistics in a use model statistics storage in response to determining that the memory subsystem is powering down. For example, use model statistics determination component 113 stores the tracked use model statistics in a next free page of an SLC block of model statistics storage 205. Further details with regard to storing the use model statistics in a use model statistics storage are described with reference to FIGS. 2 and 3.

Figure 5:
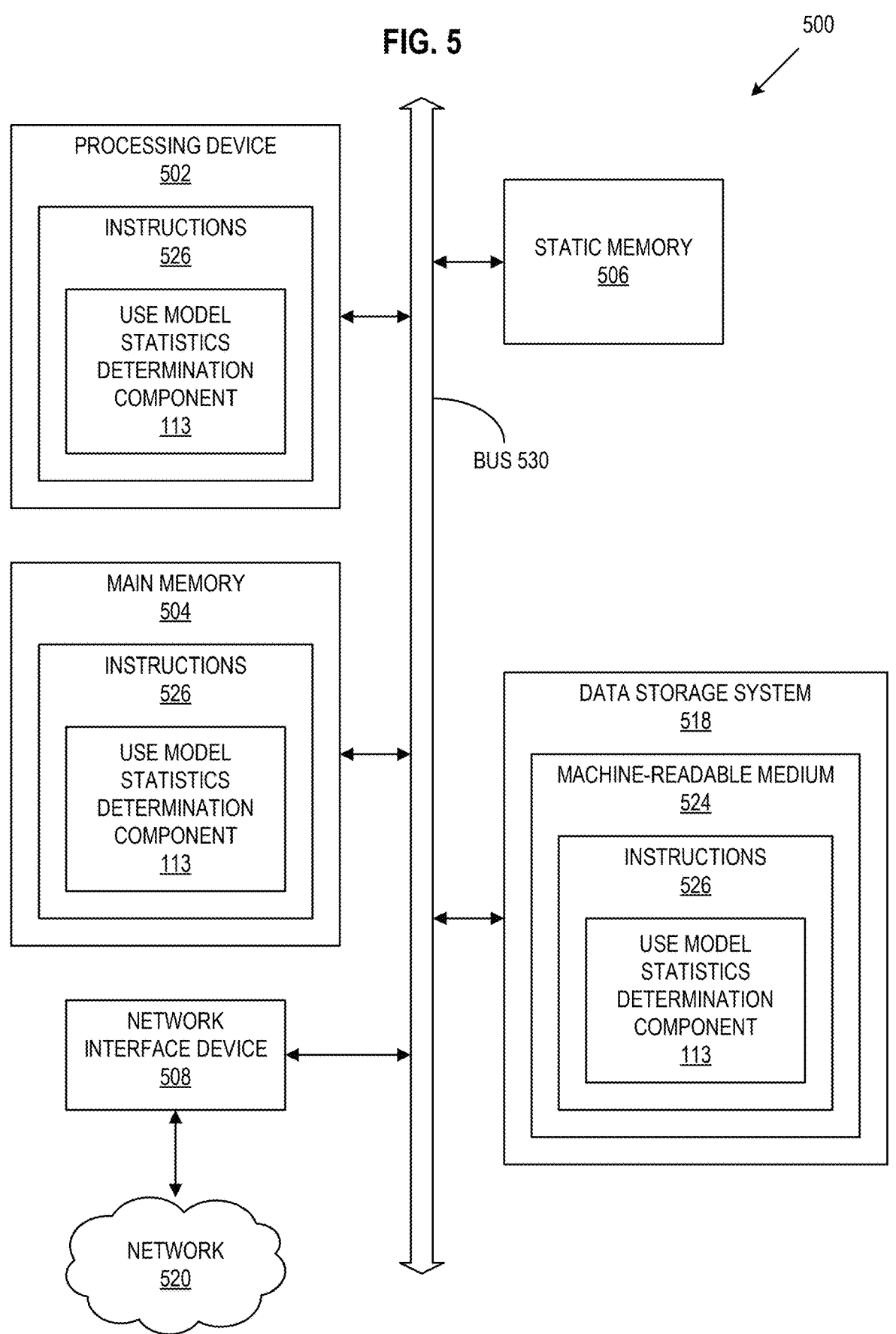
FIG. 5 is a block diagram of an example computer system in which embodiments of the present disclosure may operate.

FIG. 5 illustrates an example machine of a computer system 500 within which a set of instructions for causing the machine to perform any one or more of the methodologies discussed herein can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to use model statistics determination component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a smart device, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526, constituting machine-readable storage media, can also reside, completely or at least partially, within the main memory 504 and/or within the processing device 502 during execution thereof by the computer system 500, the main memory 504 and the processing device 502. The machine-readable storage medium 524, data storage system 518, and/or main memory 504 can correspond to the memory subsystem 10 of FIG. 1.

In one embodiment, the instructions 526 include instructions to implement functionality corresponding to a use model statistics determination component (e.g., the use model statistics determination component 113 of FIG. 1). While the machine-readable storage medium 524 is shown in an example embodiment to be a single medium, the term "machine-readable storage medium" should be taken to include a single medium or multiple media that store the one or more sets of instructions (e.g., instructions 526). The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 300 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

determining, by a controller of a memory subsystem, use model statistics for a memory portion of the memory subsystem, wherein the use model statistics include a number of commands received by the controller of the memory subsystem from a host system targeting the memory portion and details about the memory subsystem;

estimating a program erase cycle count for the memory portion using the number of commands, wherein the use model statistics further includes the program erase cycle count;

determining that the memory subsystem is powering down; and storing, by the memory subsystem, in response to determining that the memory subsystem is powering down, the use model statistics in a use model statistics storage of the memory subsystem, wherein the use model statistics storage includes memory portions accessible by the host system.

2. The method of claim 1, further comprising:

determining, at power up of the memory subsystem, a next free memory subportion of the use model statistics storage, wherein storing the use model statistics comprises storing the use model statistics in the next free memory subportion.

3. The method of claim 1, wherein the details about the memory subsystem include register data based on status bits of a register of the memory portion.

4. The method of claim 1, wherein the details about the memory subsystem further include a temperature of the memory portion.

5. The method of claim 1, further comprising:

receiving, from the host system, a command to store the use model statistics; and storing, by the memory subsystem, in response to receiving the command, the use model statistics in the use model statistics storage.

6. The method of claim 1, further comprising:

receiving, from the host system, a command to read the use model statistics storage;

executing, in response to receiving the command, a read operation on the use model statistics storage; and sending results of the executed read operation to the host system.

7. A non-transitory computer-readable storage medium comprising instructions that, when executed by a processing device, cause the processing device to:

determine, by a controller of a memory subsystem, use model statistics for a memory portion of the memory subsystem, wherein the use model statistics include a number of commands received by the controller of the memory subsystem from a host system targeting the memory portion and details about the memory subsystem;

estimate a program erase cycle count for the memory portion using the number of commands, wherein the use model statistics further includes the program erase cycle count;

determine that the memory subsystem is powering down; and store, by the memory subsystem, in response to determining that the memory subsystem is powering down, the use model statistics in a use model statistics storage of the memory subsystem, wherein the use model statistics storage includes memory portions accessible by the host system.

8. The non-transitory computer-readable storage medium of claim 7, wherein the processing device is further to:

determine, at power up of the memory subsystem, a next free memory subportion of the use model statistics storage, wherein storing the use model statistics comprises storing the use model statistics in the next free memory subportion.

9. The non-transitory computer-readable storage medium of claim 7, wherein the details about the memory subsystem include register data based on status bits of a register of the memory portion.

10. The non-transitory computer-readable storage medium of claim 7, wherein the details about the memory subsystem further include a temperature of the memory portion.

11. The non-transitory computer-readable storage medium of claim 7, wherein the processing device is further to:

receive, from the host system, a command to store the use model statistics; and store, by the memory subsystem, in response to receiving the command, the use model statistics in the use model statistics storage.

12. The non-transitory computer-readable storage medium of claim 7, wherein the processing device is further to:

receive, from the host system, a command to read the use model statistics storage;

execute, in response to receiving the command, a read operation on the use model statistics storage; and send results of the executed read operation to the host system.

13. A system comprising:

a plurality of memory devices; and a processing device, operatively coupled with the plurality of memory devices, to:

determine, at power up of a memory subsystem, a next free memory subportion of a use model statistics storage, wherein storing the use model statistics comprises storing the use model statistics in the next free memory subportion;

determine, by a controller of the memory subsystem, use model statistics for a memory portion of the memory subsystem, wherein the use model statistics include a number of commands received by the controller of the memory subsystem from a host system targeting the memory portion and details about the memory subsystem;

estimate a program erase cycle count for the next free memory portion using the number of commands, wherein the use model statistics further includes the program erase cycle count;

determine that the memory subsystem is powering down; and store, by the memory subsystem, in response to determining that the memory subsystem is powering down, the use model statistics in the use model statistics storage of the memory subsystem, wherein the use model statistics storage includes memory portions accessible by the host system.

14. The system of claim 13, wherein the details about the memory subsystem include register data based on status bits of a register of the memory portion.

15. The system of claim 13, wherein the details about the memory subsystem further include a temperature of the memory portion.

16. The system of claim 15, wherein the processing device is further to:

receive, from the host system, a command to store the use model statistics; and store, by the memory subsystem, in response to receiving the command, the use model statistics in the use model statistics storage.

17. The system of claim 13, wherein the processing device is further to:

receive, from the host system, a command to read the use model statistics storage;

execute, in response to receiving the command, a read operation on the use model statistics storage; and send results of the executed read operation to the host system.

* * * * *